US010378500B2

(12) United States Patent
Bean et al.

(10) Patent No.: US 10,378,500 B2
(45) Date of Patent: Aug. 13, 2019

(54) PROTECTION DEVICE FOR LIMITING PUMP CAVITATION IN COMMON RAIL SYSTEM

(71) Applicant: Caterpillar Inc., Peoria, IL (US)

(72) Inventors: Sunil Bean, Woodridge, IL (US); Daniel Puckett, Peoria, IL (US); Michael Sattler, Galesburg, IL (US)

(73) Assignee: Caterpillar Inc., Deerfield, IL (US)

( * ) Notice: Subject to any disclaimer, the term of this patent is extended or adjusted under 35 U.S.C. 154(b) by 301 days.

(21) Appl. No.: 15/277,301

(22) Filed: Sep. 27, 2016

(65) Prior Publication Data

US 2018/0087479 A1 Mar. 29, 2018

(51) Int. Cl.

| | |
|---|---|
| ***F02M 63/02*** | (2006.01) |
| ***F02M 59/46*** | (2006.01) |
| ***F02M 63/00*** | (2006.01) |
| ***F16K 15/02*** | (2006.01) |
| ***F16K 17/04*** | (2006.01) |
| ***F16K 17/30*** | (2006.01) |

(52) U.S. Cl.

CPC .......... *F02M 63/025* (2013.01); *F02M 59/46* (2013.01); *F02M 63/005* (2013.01); *F02M 63/0245* (2013.01); *F16K 15/025* (2013.01); *F16K 17/048* (2013.01); *F16K 17/30* (2013.01); *F02M 2200/04* (2013.01)

(58) Field of Classification Search

CPC ............... F02M 63/025; F02M 63/005; F02M 63/0245; F02M 59/46; F02M 2200/04; F02M 63/0235; F16K 17/30; F16K 17/048; F16K 15/025

USPC ......................... 123/446–447, 455–459, 461

See application file for complete search history.

(56) References Cited

U.S. PATENT DOCUMENTS

| | | | | |
|---|---|---|---|---|
| 3,431,900 A * | 3/1969 | Jackson | F02M 69/18 | 123/445 |
| 3,665,950 A * | 5/1972 | Nelson | F02C 7/232 | 137/107 |
| 3,805,678 A * | 4/1974 | Bianchetta | F15B 11/003 | 91/447 |
| 3,986,795 A * | 10/1976 | Kranc | F02M 59/462 | 417/296 |
| 4,328,827 A * | 5/1982 | Enjolras | F16K 17/044 | 137/512.2 |
| 5,295,469 A * | 3/1994 | Kariya | F02M 63/0007 | 123/456 |
| 5,711,275 A * | 1/1998 | Minagawa | F02D 41/3082 | 123/179.17 |

(Continued)

FOREIGN PATENT DOCUMENTS

| | | | |
|---|---|---|---|
| DE | 102007010502 | 9/2008 | |
| DE | 102011087957 | 6/2013 | |
| WO | WO-2013093179 A1 * | 6/2013 | F02M 63/0052 |

*Primary Examiner* — Sizo B Vilakazi
*Assistant Examiner* — Brian R Kirby
(74) *Attorney, Agent, or Firm* — Jonathan F. Yates

(57) ABSTRACT

A pressurized fuel system for an engine includes a fuel pump in a pump protection device structured to drain pressurized fuel from a common rail to provide fuel flow through the fuel pump that limits cavitation. The device includes a valve mechanism having a first valve and a second valve that are movable to an open position and a closed position respectively, in response to valve opening and valve closing rail pressures. The active pressure range of the device may be a medium pressure range.

20 Claims, 3 Drawing Sheets

(56) References Cited

U.S. PATENT DOCUMENTS 5,718,207 A * 2/1998 Ito .......................... F02M 37/08 123/179.16
6,065,453 A * 5/2000 Zych .................... F02M 55/001 123/514
6,125,822 A * 10/2000 Janik ...................... F02M 55/00 123/457
6,209,527 B1 * 4/2001 Bueser .................... F16K 17/06 123/506
6,279,541 B1 * 8/2001 Doane ................. F02D 41/3082 123/497
6,446,612 B1 * 9/2002 Hankins ................ F02D 33/006 123/459
6,837,219 B2 * 1/2005 York .................. F02M 37/0029 123/457
6,915,787 B2 * 7/2005 Yoshioka ............... F02M 37/10 123/457
7,273,041 B2 * 9/2007 Larsson ............. F02M 37/0023 123/516
7,318,414 B2 * 1/2008 Hou .................... F02D 41/3836 123/458
7,954,477 B2 6/2011 Gruber et al.
8,091,583 B2 * 1/2012 Olshanetsky ...... F02M 25/0872 137/493.2
8,608,456 B2 * 12/2013 Hishinuma ........... F04B 1/0452 123/446
8,683,981 B2 * 4/2014 Uryu ................... F02D 41/3082 123/456
9,062,644 B2 * 6/2015 Erb ...................... F02M 63/005
9,169,815 B2 * 10/2015 Akita ................... F02M 55/002
2003/0188716 A1 * 10/2003 Grossner ............ F02M 37/0029 123/447
2004/0250795 A1 12/2004 Stroia et al.
2006/0151031 A1 * 7/2006 Krenzer .............. F16K 17/0433 137/538
2006/0196476 A1 * 9/2006 Stockner ............ F02M 63/0012 123/457
2007/0034191 A1 * 2/2007 Oono .................. F02D 41/3845 123/456
2007/0251501 A1 * 11/2007 Sawut ................. F02D 41/3082 123/458
2008/0022974 A1 * 1/2008 Stockner ............ F02M 63/0225 123/457
2009/0151700 A1 * 6/2009 Kondoh ............. F02M 37/0052 123/457
2009/0205616 A1 * 8/2009 Bodzak .............. F02M 37/0029 123/512
2011/0126804 A1 * 6/2011 Lucas .................. F02M 59/366 123/456
2014/0305410 A1 10/2014 Lucas
2015/0322908 A1 * 11/2015 Avireddi .............. F02M 59/462 123/456

* cited by examiner

PROTECTION DEVICE FOR LIMITING PUMP CAVITATION IN COMMON RAIL SYSTEM

TECHNICAL FIELD

The present disclosure relates generally to limiting pump cavitation in a pressurized fluid system, and more particularly to a pump protection device having an active range at medium pressures.

BACKGROUND

Systems for supplying, distributing and handling pressurized fluids such as pressurized fuel are widespread in the internal combustion engine and machinery fields. For certain engines, notably compression ignition engines, a pressurized fuel system is often used for delivering combustible fuel to individual cylinders by way of fuel injectors. The relatively high pressures of the fuel can assist in atomization of fuel spray to various ends, notably efficiency and reduction of certain emissions. The mechanisms used for pressurizing the fuel, distributing the fuel to individual fuel injectors, and containing fuel throughout the system under relatively high pressures tend to be robust and highly sophisticated. Fuel pressures in some modern systems can exceed 300 MPa.

Decades ago engineers developed so-called common rail fuel systems where a fuel reservoir is maintained at or close to a desired pressure. A plurality of individual fuel injectors fluidly connected to the common rail can be supplied with the fuel at rail pressure and selectively operated to effect fuel injection. Certain variations on the basic common rail design have been developed more recently, including systems where a plurality of separate fuel accumulators are positioned fluidly between a common rail and each of a plurality of fuel injectors. Certain other systems can include variations on these general themes.

As noted above, pressurized fuel system equipment tends to be sophisticated, and components such as pumps, seals, fluid conduits and the like are generally relatively robustly designed. For various reasons, one of which is the tendency for cavitation of the liquid fuel to occur, the high pressure fuel system environment can be relatively harsh, and component service lives are therefore commonly short. Commonly owned U.S. Pat. No. 6,647,966 to Ye Tian teaches a typical common rail fuel injection system.

SUMMARY OF THE INVENTION

In one aspect, a fuel system for an internal combustion engine includes a fuel supply having a common rail and a fuel pump. The fuel pump is coupled with the fuel supply and structured to pressurize a fuel from the fuel supply for conveying to the common rail. The fuel system further includes a plurality of fuel injectors coupled with the common rail and structured to inject the fuel into a plurality of cylinders in an internal combustion engine. The fuel system further includes a pump protection device structured to drain pressurized fuel from the common rail to provide a fuel flow through the fuel pump that limits cavitation within the fuel pump. The pump protection device includes a valve body having an inlet fluidly connected with the common rail, a drain outlet, and a valve mechanism positioned within the valve body fluidly between the inlet and the outlet. The valve mechanism further includes a first valve member movable between a closed position inhibiting fluid flow through the inlet, and an open position, and a second valve member movable between a closed position inhibiting fluid flow through the outlet, and an open position. The valve mechanism further includes at least one biaser biasing the first valve member and the second valve member toward the closed position and the open position, respectively.

In another aspect, a pump protection device for limiting cavitation in a pump in a fuel system includes a valve body having an inlet structured to fluidly connect with a common rail in a fuel system, and a drain outlet. The device further includes a valve mechanism positioned within the valve body fluidly between the inlet and the drain outlet. The valve mechanism includes a first valve member movable between a closed position in contact with a first valve seat within the valve body to inhibit fluid flow through the inlet, and an open position. The valve mechanism further includes a second valve member movable between a closed position in contact with a second valve seat within the valve body to inhibit fluid flow through the drain outlet, and an open position. The valve mechanism still further includes at least one biaser biasing the first valve member and the second valve member toward the closed position and the open position, respectively.

In still another aspect, a method of operating a pressurized fluid system includes supplying pressurized fuel at a valve opening pressure to a first valve in a pump cavitation protection device fluidly connected with a common rail, and opening the first valve in response to the supplying of the pressurized fluid at the valve opening pressure, such that the pressurized fluid is drained from the common rail to produce a fluid flow through a pump supplying the pressurized fluid to the common rail that limits cavitation within the pump. The method further includes supplying pressurized fluid at a valve closing pressure greater than the valve opening pressure to a second valve in the pump cavitation protection device, and closing the second valve in response to the supplying of the pressurized fluid at the valve closing pressure such that the draining of the pressurized fluid is stopped.

DETAILED DESCRIPTION

Figure 1:
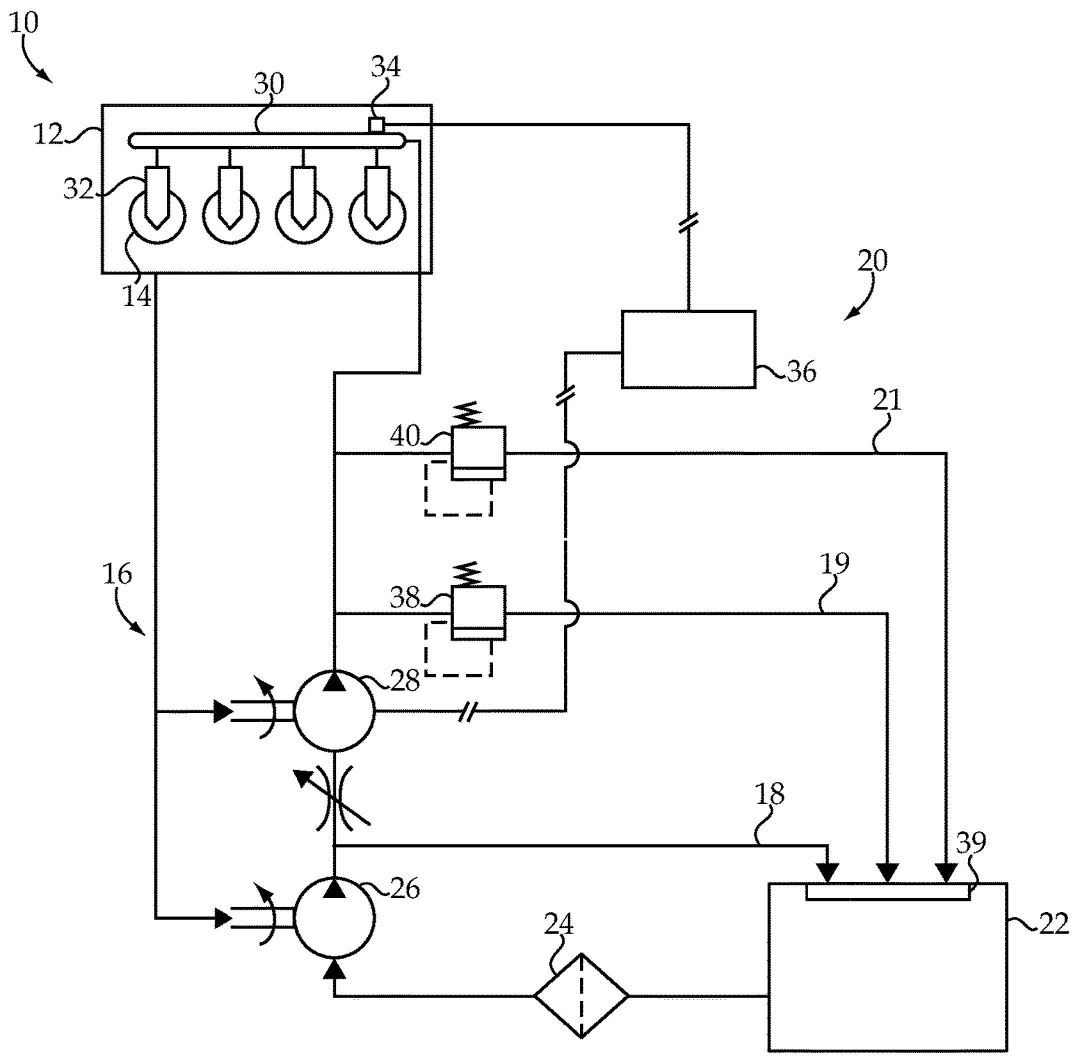
FIG. 1 is a schematic view of an engine system, including a fuel system, according to one embodiment.

Referring to FIG. 1, there is shown an internal combustion engine system 10, according to one embodiment, and including an engine housing 12 having a plurality of cylinders 14 formed therein. Engine system 10 may be a compression ignition diesel engine system, however, the present disclosure is not thereby limited. A total of four cylinders 14 are shown, however, it should be appreciated that any number of cylinders might be formed in engine housing 12 and arranged in any suitable configuration. Internal combustion engine system 10 (hereinafter "engine system 10") may include a pressurized fluid system in the nature of a fuel system 20. Fuel system 20 may include a plurality of fuel injectors 32 each positioned at least partially within one of cylinders 14 to directly inject a fuel therein. Fuel system 20 may further include a fuel supply 22, such as a fuel tank, a common rail 30, and various additional components positioned fluidly between common rail 30 and fuel supply 22. A fuel filter 24 may be positioned to receive a flow of fuel from fuel supply 22, which fuel is then supplied to a low pressure fuel transfer pump 26. A drain conduit 18 may extend from transfer pump 26 back to a drain inlet 39 of fuel supply 22. Fuel from transfer pump 26 may generally be conveyed to a high pressure fuel pump 28 structured to increase a pressure of the fuel to a desired rail pressure, for conveying to common rail 30. In a practical implementation strategy, a mechanical coupling 16 such as an engine gear train or components driven by an engine gear train provides rotational power to transfer pump 26 and high pressure pump 28, the significance of which will be further apparent from the following description.

Fuel system 20 may also be equipped with a pump protection device 40 structured to drain pressurized fuel from common rail 30 to provide a fuel flow through fuel pump 28 that limits cavitation within fuel pump 28, details of which are further discussed below. Fuel system 20 is still further equipped, in a practical implementation strategy, with a pressure relief valve 38. The design and functioning of pressure relief valve 38 and pump protection device 40 may be such that valve 38 and device 40 selectively drain or bleed pressurized fuel from common rail 30 to drain inlet 39 of fuel supply 22 under different pressure conditions. In a practical implementation strategy, pump protection device 40 may be active in a range of medium fuel pressures, which have been discovered to be associated with cavitation in pump 28 under at least certain conditions, whereas pressure relief valve 38 may be active at higher pressures, the significance of which will also be further apparent from the following description. Drain lines or conduits 19 and 21 connect pressure relief valve 38 and device 40, respectively, to drain inlet 39 of fuel supply 22. Fuel system 20 may further include a pressure sensor 34 structured to sense a fluid pressure in common rail 30, and an electronic control unit or ECU 36 coupled with pressure sensor 34 and also with pump 28. By sensing rail pressure pump 28 can be operated, such as by varying pump displacement or pump speed or inlet or outlet metering, to provide a desired rail pressure. In a practical implementation strategy pump 28 may include an inlet metered pump, however, the present disclosure is not thereby limited.

Figure 2:
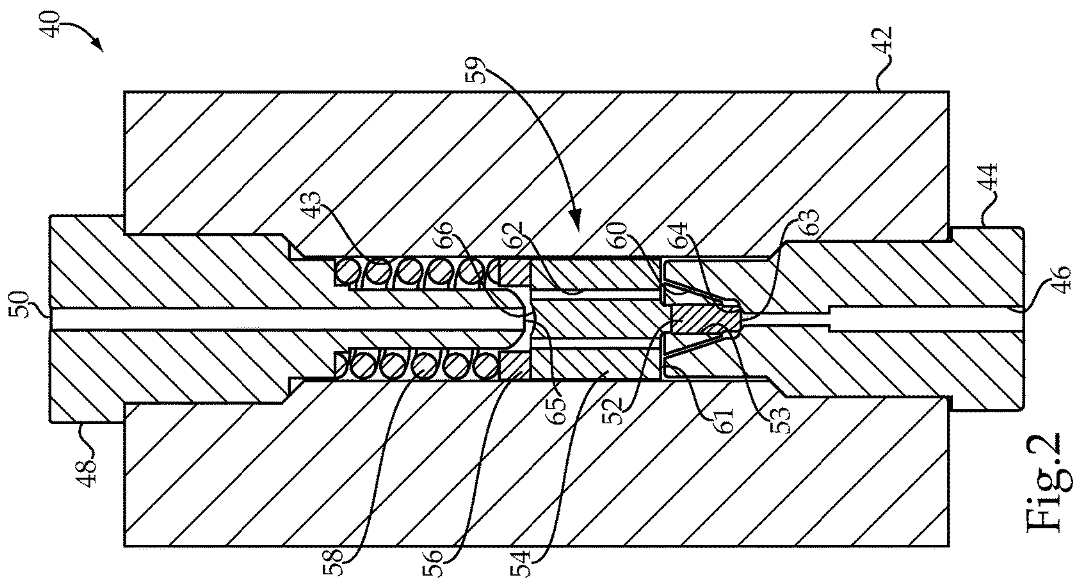
FIG. 2 is a sectioned side diagrammatic view of a pump protection device in a first state, according to one embodiment.

Referring also now to FIG. 2, there is shown pump protection device 40 in further detail, and illustrating a valve body 42 having an inlet 46 formed therein that is fluidly connected with or structured to fluidly connect with common rail 30, and a drain outlet 50. In the illustrated embodiment inlet 46 is formed in an inlet fitting 44 that is engaged by way of threads with a base piece (not numbered) of valve body 42, and drain outlet 50 is formed in an outlet fitting 48 similarly attached. Drain outlet 50 may fluidly connect with drain conduit 21 for returning drained fuel to fuel supply 22. Pump protection device 40 further includes a valve mechanism 59 positioned within valve body 42 fluidly between inlet 46 and outlet 50. Valve mechanism 59 may include a first valve member 52 movable between a closed position contacting a first valve seat 64 within valve body 42 and inhibiting fluid flow through inlet 46, and an open position. Valve mechanism 59 further includes a second valve member movable between a closed position contacting a second valve seat 65 within valve body 42 and inhibiting fluid flow through outlet 50, and an open position. In a practical implementation strategy, second valve number 54 may include one or more fluid orifices 62 formed therein that fluidly connect inlet 46 to drain outlet 50 when each of valve member 52 and valve member 54 is in an open position. It can also be seen that valve seat 65 is formed on a tip of fitting 48, however, it should be appreciated that a variety of other strategies including valve seat 65 being formed on a different component of mechanism 59 could be used. A seating surface 66 which may include a spherical or conical seating surface is formed on an end of second valve member 54, radially inward of orifices 62. Contact between seating surface 66 and valve seat 65 can block or prevent fluid flow between orifices 62 and outlet 50. In a practical implementation strategy, valve mechanism 59 further includes at least one biaser 58 biasing first valve member 52 and second valve member 54 toward the closed position and the open position, respectively.

It can also be seen from FIG. 2 that one or more additional orifices 60 are formed in inlet fitting 44 to fluidly connect inlet 46 with orifices 62 when first valve member 52 is moved away from its closed position blocking valve seat 64. Orifices 60 and 62 may each be considered to provide a segment of a fluid flow path between inlet 46 and drain outlet 50. Biaser 58, second valve 54, and first valve 52, as well as at least portions of inlet fitting 44 and outlet fitting 48 can be positioned within a bore 43 extending through valve body 42 or parts of valve body 42. Valve member 52 is movable within a bore 53 located radially inward of orifices 60. Valve members 52 and 54 are generally coaxially aligned.

In a further practical implementation strategy, first valve member 52 includes an opening hydraulic surface 63 having a first surface area, and second valve member 54 includes a closing hydraulic surface 61 having a second surface area. The first surface area may be smaller than the second surface area, such that pump protection device 40 is active to drain pressurized fuel from common rail 30 in a range of rail pressures. Second valve member 54 may be in contact with first valve member 52 within valve body 42, and transmits a biasing force of biaser 58 to first valve member 52. First valve member 52 and second valve member 54 may be movable in the same travel direction within valve body 42 between the corresponding open or closed positions. In FIG. 2, valve assembly 59 is shown arranged such that first valve member 52 is in its biased-closed position and second valve member 54 is in its biased-open position. Biaser 58, which may include a biasing spring, also includes a lift spacer or the like 56 that in turn contacts second valve member 54, to bias first valve member 52 and second valve member 54 to the positions shown in FIG. 2. In other embodiments, multiple different biasers, such as in a design where valve members 52 and 54 do not contact one another, might be used.

Figure 3:
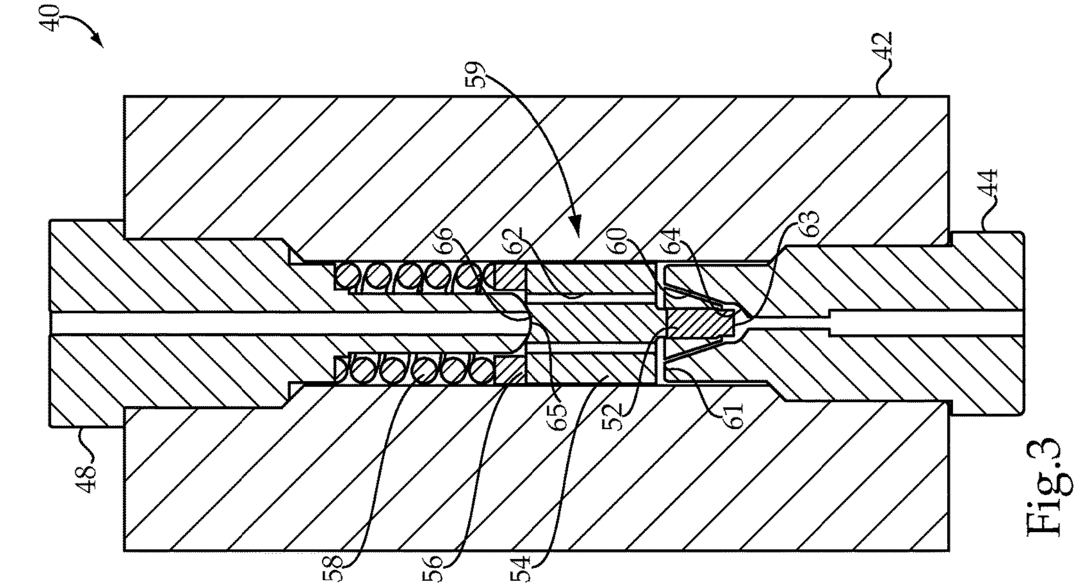
FIG. 3 is a sectioned side diagrammatic view of the device of FIG. 2 in a second state.
Figure 4:
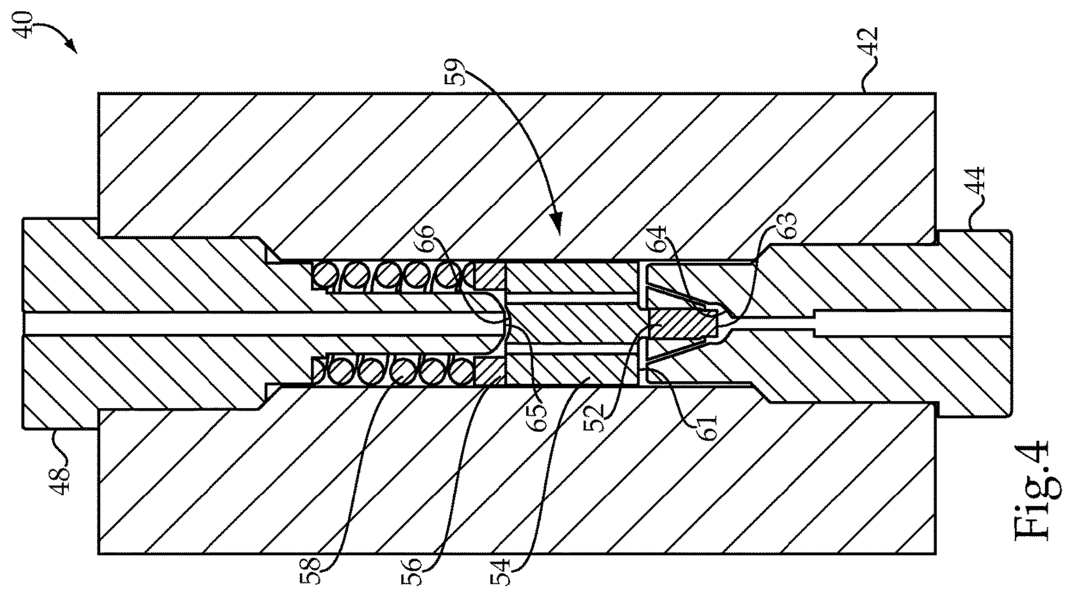
FIG. 4 is a sectioned side diagrammatic of the device of FIGS. 2 and 3 in yet another state.

In FIG. 3, valve mechanism 59 is shown as it might appear where first valve member 52 has been moved from its closed position to its open position and second valve member 54 has been moved from its open position to its closed position. Accordingly, it will be understood that in FIG. 2 pump protection device 40 is in an inactive state, where it is not draining pressurized fuel from common rail 30. In FIG. 3, pump protection device 40 can also be understood to be in a closed or inactive state and is not draining fuel from common rail 30. In FIG. 4, valve mechanism 59 is shown as it might appear where first valve member 52 has moved from its closed position to its open position, and second valve member 54 has moved from a fully open position slightly toward a closed position, but has not yet reached a closed position. In FIG. 4, valve mechanism 59 and pump protection device 40 can be understood to be in an active state, draining fuel from common rail 30. Valve mechanism 59 may also be understood to move from the configuration shown in FIG. 2 to the configuration shown in FIG. 4 in response to supplying pressurized fluid to common rail 30 at a valve opening pressure. Valve mechanism 59 may be understood to adjust from the configuration shown in FIG. 4 to the configuration shown in FIG. 3 to close second valve 54 in response to supplying pressurized fluid, namely fuel, at a valve closing pressure greater than the valve opening pressure. When pressure supplied to inlet 46 falls below the valve opening pressure needed to open or move first valve member 52 from its closed position, valve mechanism 59 will return from the configuration shown in FIG. 4 to the configuration shown in FIG. 2. It will therefore be appreciated that device 40 will generally be inactive until such time as a valve opening pressure is supplied to inlet 46, upon or slightly after which first valve 52 and second valve 54 will begin to move in a common travel direction to admit pressurized fuel and drain the same through drain outlet 50. So long as the pressure is maintained at or above the valve opening pressure but not equal to or above a valve closing pressure, fluid will continue to drain through device 40. When the pressure rises to a level equal to or exceeding the valve closing pressure, device 40 will be inactivated. At a still higher valve opening pressure higher than the valve closing pressure, relief valve 38 may open to drain fuel out of common rail 30.

In a practical implementation strategy, the valve opening pressure needed to activate device 40 is defined by device 40 and dependent upon a size of the first surface area and a biasing force of biaser 58. The valve closing pressure is greater than the valve opening pressure as described herein, independent from a size of the second surface area and a biasing force of biaser 58. When device 40 is activated, pressurized fluid fed into device 40 through inlet 46 acts on opening hydraulic surface 63. As first valve member 52 moves away from valve seat 64 pressurized fuel flows through orifices 60 and exerts a force on closing hydraulic surface 61, as well as flowing through orifices 62 and thenceforth out of outlet 50. When the fluid pressure is sufficient, the hydraulic force exerted on closing hydraulic surface 61 will be sufficient to overcome the biasing force of biaser 58 and move second valve member 54 into contact with valve seat 65 to block fluid flow through device 40. It will be appreciated that various factors can bear on the magnitude of the valve opening pressure, the magnitude of the valve closing pressure, the pressure range between those two pressures. For instance, if the first surface area, of opening hydraulic surface 63, is made relatively larger, then device 40 will be activated, other factors being equal, at a relatively lower valve opening pressure. If orifices 62 are made relatively smaller in cross sectional area, for instance, then the valve closing pressure, other factors being equal, may be relatively lower. Accordingly, device 40 can be designed to suit a variety of different applications, such that device 40 is activated to drain pressurized fuel within a pressure range whose size can be selected, and the extremes of which can be set, depending upon engine and fuel system conditions where pump cavitation is expected or known to occur. As further discussed below, it has been observed that pump cavitation can occur where a pump is operating at a relatively high pumping speed but the rate at which fuel is drained from a common rail to feed fuel injectors is relatively small.

INDUSTRIAL APPLICABILITY

As alluded to above, certain engine and pump and fuel system operating conditions have been observed to be associated with cavitation in a fuel pump. Many fuel pumps, and high pressure fuel pump 28, operate at pump speeds that are linked to a speed of the associated engine. Accordingly, as engine speed increases pump speed tends to increase as well. Engine fuel demand, however, can vary independently of engine speed. When an engine is speeding up or otherwise operating to accommodate an increasing engine load, it will generally be desirable to increase fueling amounts, and fuel flow is generally sufficient to avoid cavitation. Likewise, at high power conditions the engine is typically fueled at as high a rate as practicable. In other instances, where the rate of fuel withdrawn from a common rail, and thus a fuel flow through the pump, is relatively low but pump speed is relatively high, cavitation is more apt to occur. It will thus be understood that this combination of relatively low fueling rate and relatively high or at least medium pump speed can occur relatively commonly during operating an internal combustion engine, especially where engine operation is relatively dynamic with respect to engine speed and engine load. The present disclosure contemplates draining fuel through device 40 so as to increase fuel flow through fuel pump 28 in conditions that otherwise might not produce sufficient fuel flow to limit cavitation.

Figure 5:
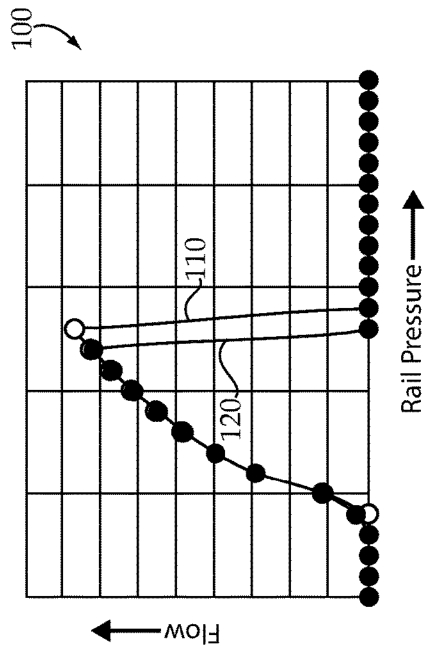
FIG. 5 is a graph of rail pressure in comparison to fluid flow, according to one embodiment.

Referring to FIG. 5, there is shown a graph 100 that illustrates rail pressure on the X-axis in comparison to valve flow, such as through device 40, on the Y-axis. It will be recalled that device 40 may be structured to be active in a middle part of a rail pressure range, and it can be seen from FIG. 5 that each of a first line 110 representing a trend of increasing rail pressure and a second line 120 representing a trend of decreasing rail pressure show flow through device 40 that is zero at relatively low oil pressures, ramps up relatively steeply to a maximum in a middle part of the rail pressure range, and then drops off to zero at a higher part of the rail pressure range. Adjusting various of the factors discussed above such as surface area, relative surface areas, and biasing force can result in flow patterns that are shifted from those depicted in FIG. 5. The middle part of the rail pressure range may be desirable for device 40 to be active for several reasons, however, including the fact that during cranking or initial acceleration it is generally desirable to avoid draining any extra fuel, and likewise at high power applications or in high power demand situations generally, the engine will need all the fuel that can be provided.

Figure 6:
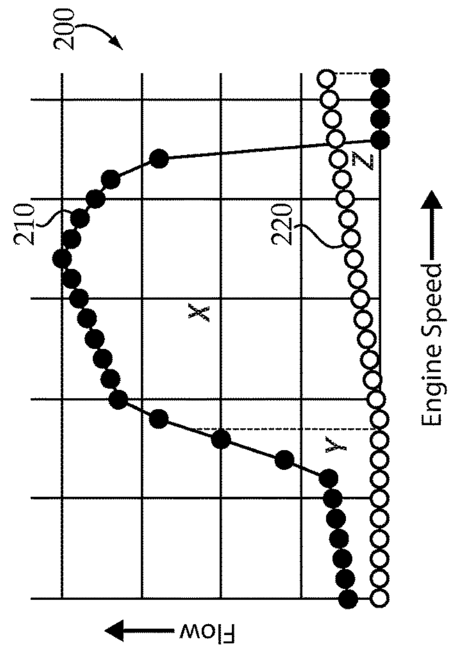
FIG. 6 is a graph of engine speed in comparison to fluid flow, according to one embodiment.

Referring also now to FIG. 6, there is shown a graph 200 of engine speed on the X-axis in comparison to flow through the fuel pump on the Y-axis, and illustrating an engine load fuel curve 200 and a minimum allowable pump flow curve 220. Regions under curves 210 and 220 are divided into a region Y, a region X, and a region Z. In region Z, typically a motoring or high idle type condition, pump damage can occur due to cavitation at high speed and low engine fueling demand. It will generally be desirable to set rail pressure in region Z to a range that will trigger device 40 to activate and create more leakage flow to bring the fuel pump flow over a minimum flow requirement. In regions X and Y, it is generally not desirable to have extra leakage implemented, as these are cranking and high power regions, and the engine generally needs as much fuel flow as can be delivered. In these regions Y and X, rail pressure can be set based on emissions and efficiency, and so that rail pressure is out of the active zone of device 40. It should be appreciated that an engine could operate anywhere on curve 210, or below it. In certain instances, rail pressure settings may be adjusted proactively so that when conditions actually occur that could otherwise lead to cavitation, device 40 is open or in the process of opening to commence draining of pressurized fuel. Thus, pump 28 could be operated to produce a rail pressure equal to at least the valve opening pressure responsive to an expected decrease in the draining of additional fuel from common rail 30 to supply fuel injectors 32. Device 40 may be active during the draining of fuel to feed fuel injectors as discussed herein, and in some instances may be activated during or in response to increasing pump speed and engine speed, or potentially during decreasing pump speed and engine speed. All manner of different engine operating conditions where device 40 might find applications will be apparent to those skilled in the art in view of the present disclosure.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A fuel system for an internal combustion engine comprising:
- a fuel supply;
- a common rail;
- a fuel pump coupled with the fuel supply and structured to pressurize a fuel from the fuel supply for conveying to the common rail;
- a plurality of fuel injectors coupled with the common rail and structured to inject the fuel into a plurality of cylinders in an internal combustion engine; and
- a pump protection device structured to drain pressurized fuel from the common rail to provide a fuel flow through the fuel pump that limits cavitation within the fuel pump, the pump protection device including a valve body having an inlet fluidly connected with the common rail, a drain outlet, and a valve mechanism positioned within the valve body fluidly between the inlet and the outlet;
- the valve mechanism including a first valve member movable between a closed position inhibiting fluid flow through the inlet, and an open position, and a second valve member movable between a closed position inhibiting fluid flow through the outlet, and an open position, and at least one biases biasing the first valve member and the second valve member toward the closed position and the open position, respectively;
- the second valve member having a closing hydraulic surface, and the first valve member blocking the closing hydraulic surface from the inlet when the first valve member is at the closed position.

2. The fuel system of claim 1 wherein the first valve member includes an opening hydraulic surface having a first surface area, and the closing hydraulic surface having a second surface area.

3. The fuel system of claim 2 wherein the first surface area is smaller than the second surface area, such that the pump protection device is active to drain pressurized fuel at a range of rail pressures.

4. The fuel system of claim 2 wherein the second valve member is in contact with the first valve member within the valve body.

5. The fuel system of claim 4 wherein the second valve member transmits a biasing force of the at least one biaser to the first valve member.

6. The fuel system of claim 4 wherein the first valve member and the second valve member are movable in the same travel direction within the valve body between the corresponding open or closed positions.

7. The fuel system of claim 2 wherein the pump protection device defines a valve opening rail pressure that is dependent upon a size of the first surface area and a biasing force of the biaser, and a valve closing rail pressure that is greater than the valve opening rail pressure and is dependent upon a size of the second surface area and a biasing force of the biaser.

8. The fuel system of claim 7 further comprising a pressure relief valve coupled with the common rail and defining a second valve opening rail pressure that is greater than the valve closing rail pressure.

9. The fuel system of claim 1 further comprising a pressure relief valve coupled with the common rail, a first drain conduit fluidly connecting the pressure relief valve with the fuel supply, and a second drain conduit fluidly connecting the pump protection device with the fuel supply.

10. A pump protection device for limiting cavitation in a pump in a fuel system comprising: a valve body having an inlet structured to fluidly connect with a common rail in a fuel system, and a drain outlet; a valve mechanism positioned within the valve body fluidly between the inlet and the drain outlet; the valve mechanism including a first valve member movable between a closed position in contact with a first valve seat formed on an inlet fitting within the valve body to inhibit fluid flow through the inlet, and an open position, and a second valve member movable between a closed position in contact with a second valve seat within the valve body to inhibit fluid flow through the drain outlet, and an open position; and the valve mechanism further including at least one biaser biasing the first valve member and the second valve member toward the closed position and the open position, respectively.

11. The device of claim 10 wherein the first valve member is in contact with the second valve member within the valve body, and includes an opening hydraulic surface exposed to a pressure of fuel supplied to the inlet such that upon application of a valve opening pressure the first valve member is moved towards the open position and the second valve member is moved toward the closed position.

12. The device of claim 11 wherein the at least one biaser is in contact with the second valve member.

13. The device of claim 11 wherein the second valve member includes a closing hydraulic surface having a surface area greater than a surface area of the opening hydraulic surface.

14. The device of claim 11 wherein the second valve member includes an orifice forming a segment of a flow path fluidly connecting the inlet to the outlet when each of the first valve member and the second valve member is in the open position.

15. A method of operating a pressurized fluid system comprising:

supplying pressurized fluid at a valve opening pressure to a first valve in a pump cavitation protection device fluidly connected with a common rail;

opening a valve seat by way of the first valve in response to the supplying of the pressurized fluid at the valve opening pressure;

draining the pressurized fluid at the valve opening pressure from the common rail to an outlet of the pump cavitation protection device to produce a fluid flow through a pump supplying the pressurized fluid to the common rail that limits cavitation within the pump;

supplying pressurized fluid through the valve seat opened by the first valve at a valve closing pressure greater than the valve opening pressure to a second valve in the pump cavitation protection device; and closing the second valve in response to the supplying of the pressurized fluid at the valve closing pressure such that the draining of the pressurized fluid is stopped.

16. The method of claim 15 wherein the pressurized fluid system includes a fuel system for an internal combustion engine, and further comprising operating the pump at a pump speed that is coupled with an engine speed of the internal combustion engine.

17. The method of claim 16 wherein the opening of the first valve includes opening the first valve against a biasing force of a biaser biasing the first valve and the second valve toward a closed position and an open position, respectively.

18. The method of claim 15 wherein the pressurized fluid includes a pressurized fuel, and, the draining includes draining the pressurized fuel from the common rail during draining additional fuel from the common rail to supply a plurality of fuel injectors of the internal combustion engine.

19. The method of claim 18 wherein the supplying of the pressurized fluid at the valve opening pressure further includes operating the pump to produce the valve opening pressure responsive to a decrease in the draining of additional fuel to supply the plurality of fuel injectors.

20. The method of claim 19 wherein the operating of the pump includes operating the pump to produce the valve opening pressure during increasing of the engine speed and the pump speed.

* * * * *